July 20, 1965 R. L. LINQUIST 3,195,416
PILOT OR RELAY VALVE
Filed April 16, 1962 4 Sheets-Sheet 3

INVENTOR.
ROBERT L. LINQUIST
BY
ATTORNEY

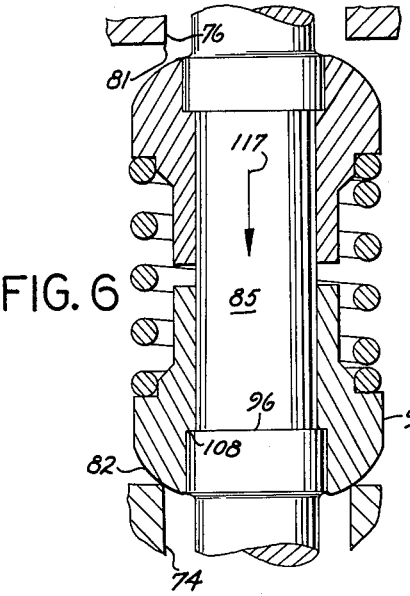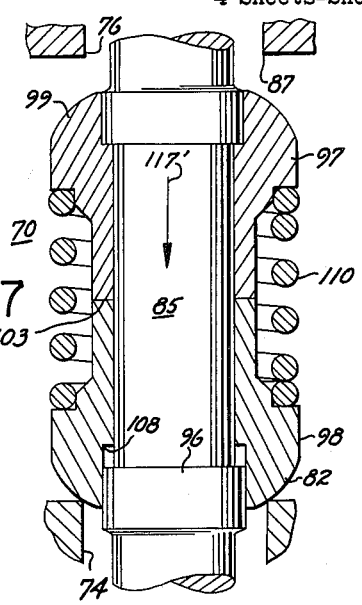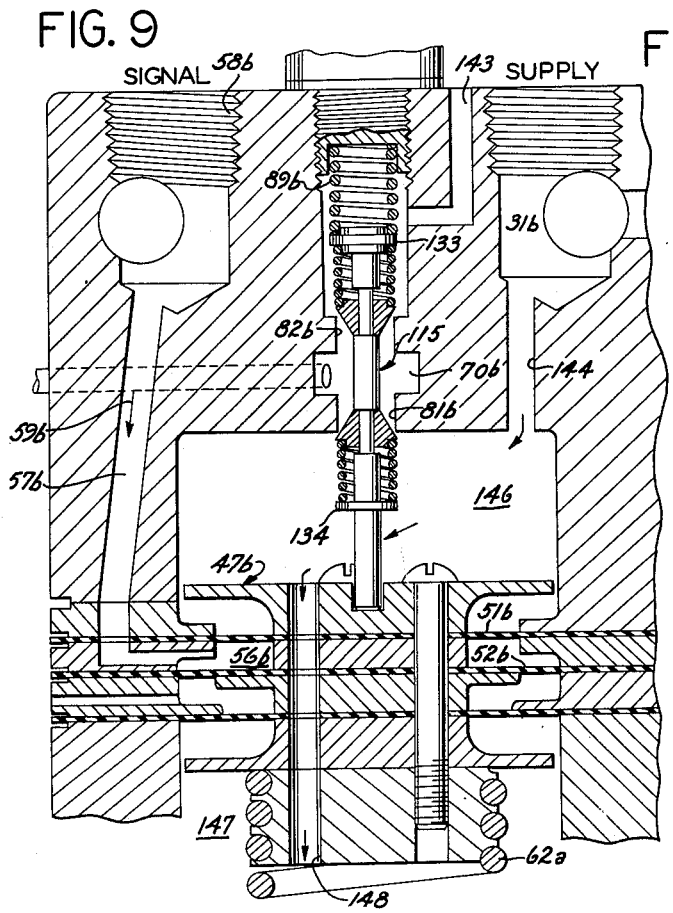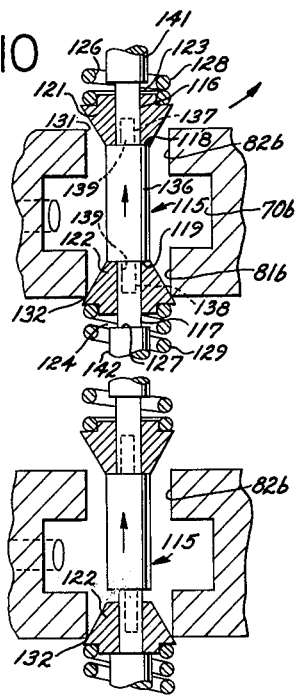

United States Patent Office 3,195,416
Patented July 20, 1965

3,195,416
PILOT OR RELAY VALVE
Robert L. Linquist, Garden Grove, Calif., assignor to Security Valve Company of California, South Pasadena, Calif., a corporation of California
Filed Apr. 16, 1962, Ser. No. 187,796
4 Claims. (Cl. 91—165)

This invention relates to a pilot or relay valve and more particularly to an improved construction of a valve useable for controlling a pneumatic, or other, positioning actuator device such as one having a piston movable in a cylinder for actuating a piston rod thereof to move in a desired direction in response to a change in a signal pressure applied to the valve which, in turn, is capable of controlling the flow of supply pressure to the cylinder.

This invention provides a new and improved valve means for controlling the movement of a pneumatic, or other, positioning actuator device for controlling the flow of a regulated supply fluid pressure. Such a device may take the form of a movable piston rod connected to a piston movable in a cylinder so as to control the flow of the regulated supply pressure to the cylinder. This invention further provides an improved construction of a valve including a valve spindle means reciprocable in a chamber of the valve body wherein the chamber includes an inlet, adapted to be connected to a source of a supply fluid under regulated pressure, an outlet adapted to be connected to atmosphere, and an opening adapted to be connected to the cylinder for communicating with the chamber so as to move a piston of the cylinder in response to a change of pressure in the diaphragm chamber. The valve spindle means extends through the chamber and is movable along an axis coincident with the axes of valve seats provided at the inlet and outlet and includes a pair of longitudinally spaced valve elements movable relative to the valve element so as to selectively be positioned into a position wherein the inlet is closed and the outlet is open for moving the piston within the cylinder in one direction, into another position wherein the outlet is closed and the inlet is open for moving the piston in an opposite direction, and into a third, intermediate or null position, wherein both the inlet and outlet are open for venting the supply pressure to atmosphere so as to maintain the required pressure necessary to prevent movement of the piston relative to the cylinder.

A standard double poppet valve is usually a solid piece carrying lands for the inlet and the outlet seats. With such a valve in null position, the speed of response is determined by the maximum travel available to the valve in either direction. In other words, the more travel permitted, the faster the fluid can enter the chamber in the valve in order to produce a response. However, a large travel produces an excessive bleed rate since the openings at the seats at the inlet and outlet are necessarily large when the valve is in its normal position. Therefore, in such construction, the bleed space varies in direct proportion to the travel permitted in either direction.

This invention, on the other hand, produces an improved construction of a valve in which the valve elements mounted on the valve spindle are movable relative to the valve spindle and to each other whereby movement of the valve spindle in one direction closes one of the valve seats and opens the other and continued movement of the valve spindle in the same direction, results in a further movement of the other of the valve elements to further unseat its respective valve seat. Further, the normal balanced null position requires a relatively small travel of the valve elements to open their respective valve seats. The valve elements are normally biased apart by compression spring means.

With this improved construction, the bleed clearance at the valve seats with the valve elements extended and in a normal, biased-apart position can be substantially reduced. However, in response to movement of the valve spindle in one direction, or the other, a valve element is moved to seat almost immediately because of the small bleed area. Further movement of the valve stem will move the other valve element away from its seat by the amount of a predetermined space between valve elements so that a large travel of the actuating valve spindle is available. This will provide an increased flow of supply fluid under pressure to give a fast response to the actuating piston. When the valve spindle is again returned to a normal position, the small bleed areas at both valve seats will again become effective. Thus, the present invention provides for both a small bleed rate and a fast actuating response.

It is therefore an object of this invention to provide a new and improved pilot or relay valve which provides for both a small bleed rate of a valve in a null, bleed position and for an increased flow of supply fluid pressure to a pneumatic, or other, positioning actuating device, or, conversely relieving the pressure, for more responsively moving an actuator member of the positioning device in one or the other direction when in an actuating position.

Another object of this invention is to provide a new and improved pilot or relay valve which provides new and improved construction for facilitating assembly of the valve structure whereby movement or positioning of the valve elements on the valve spindle is made feasible.

Still another object of this invention is to provide a new and improved pilot or relay valve in which relatively small movement of the spindle into an actuating position is required to seat one of the valve elements and unseat the other from their respective seats and wherein the spindle is capable of continued movement to further open the other valve seat to increase the flow of fluid.

A further object of this invention is to provide a new and improved pilot or relay valve which is economical to manufacture and is capable of mass production.

A general object of this invention is to provide a new and improved pilot or relay valve of the character described which overcomes disadvantages of prior means and methods heretofore intended to accomplish generally similar purposes.

These and other objects of this invention will be more apparent from the following drawings, detailed description, and appended claims.

In the drawings:

FIGURE 6 is a vertical, cross-sectional view, similar to FIGURES 3–5, and illustrating the effective position attained by the pilot valve in response to movement of a valve spindle means thereof in an opposite direction;

FIGURE 7 is a view similar to FIGURE 6, and showing the result of continued movement of said spindle means in said opposite direction of FIGURE 6;

FIGURE 9 is a fragmentary, vertical, cross-sectional view similar to FIGURE 2, and illustrating a further modified embodiment thereof;

Figure 4:
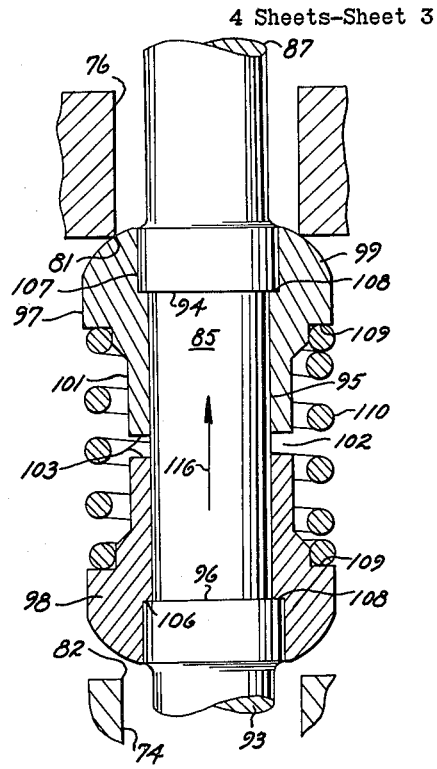
FIGURE 4 is a cross-sectional view, similar to FIGURE 3, showing the initiation of movement of the spindle means of the pilot valve of FIGURE 3 in one direction.
Figure 5:
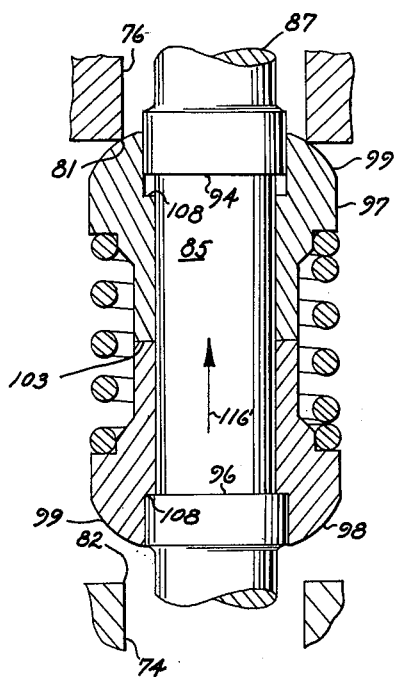
FIGURE 5 is a vertical, cross-sectional view, similar to FIGURES 3 and 4, showing the result of continued movement of the spindle means thereof in the direction of FIGURE 4.

FIGURE 10 is an enlarged, fragmentary, vertical, cross-sectional view showing the movement of the spindle means of FIGURE 9 as being initiated in one direction, corresponding to the upward direction of the spindle means of FIGURES 4 and 5; and FIGURE 11 is a vertical, cross-sectional view, similar to FIGURE 10, and showing the effect of continued movement of the spindle means of the embodiment of FIGURES 9 and 10 in said one direction of FIGURE 10.

Referring in detail to the drawings, and more particularly to FIGURES 1–7, inclusive, there is shown by way of illustration, but not of limitation, a preferred embodiment of a pilot or relay valve of this invention, designed and constructed in accordance with this invention and generally designated by the numeral 15. The pilot valve 15 is illustrated herein as being associated with a pneumatic valve actuator device generally designated by the numeral 16 which includes a piston 17 movable in a cylinder 18 for actuating a piston rod 19 secured to the piston 17 for movement therewith.

In general, the piston 17 divides the interior of the cylinder 18 into a pair of chambers 21 and 22, the chamber 21 being adapted to be communicated as through a passageway designated by the numeral 23 to a source of regulated supply pressure regulated as by a substantially conventional regulator valve generally designated by the numeral 24. The fluid pressure in the chamber 21 is thereby predetermined and regulated to be constant.

The chamber 22 (below the piston 17, as viewed in the drawings) is adapted to be communicated with the pilot valve 15, to be hereinafter described, as by a passageway like 26 to receive an actuating fluid pressure controlled by the pilot or relay valve in a manner to be hereinafter described.

The regulator 24 receives a supply pressure, indicated by the arrowed line 28, through a supply conduit 29 which communicates with a bifurcated passageway 31 having one passageway portion 32 communicating with a yieldable check valve 33 and another passageway 34 communicating with an inlet 76 of the pilot valve 15. The supply fluid passes through the passageway 32 and passes the check valve 33 to encounter the pressure regulating valve 24. When the desired pressure develops in a chamber 37 of the regulating valve 24 and communicates with the passageway 23, a valve element 38 of the pressure regulator valve 24 closes, supplying a regulated pressure through the passageway 23 to the regulator loading pressure chamber 21 of the cylinder 18 to act upon the actuating piston 17. When an excess of pressure develops in the pressure regulating valve 24, the excessive pressure causes the piston 24a to move downward and the pressure is relieved through an orifice 40 and opening 39 of the pressure regulator valve body 24.

Figure 1:
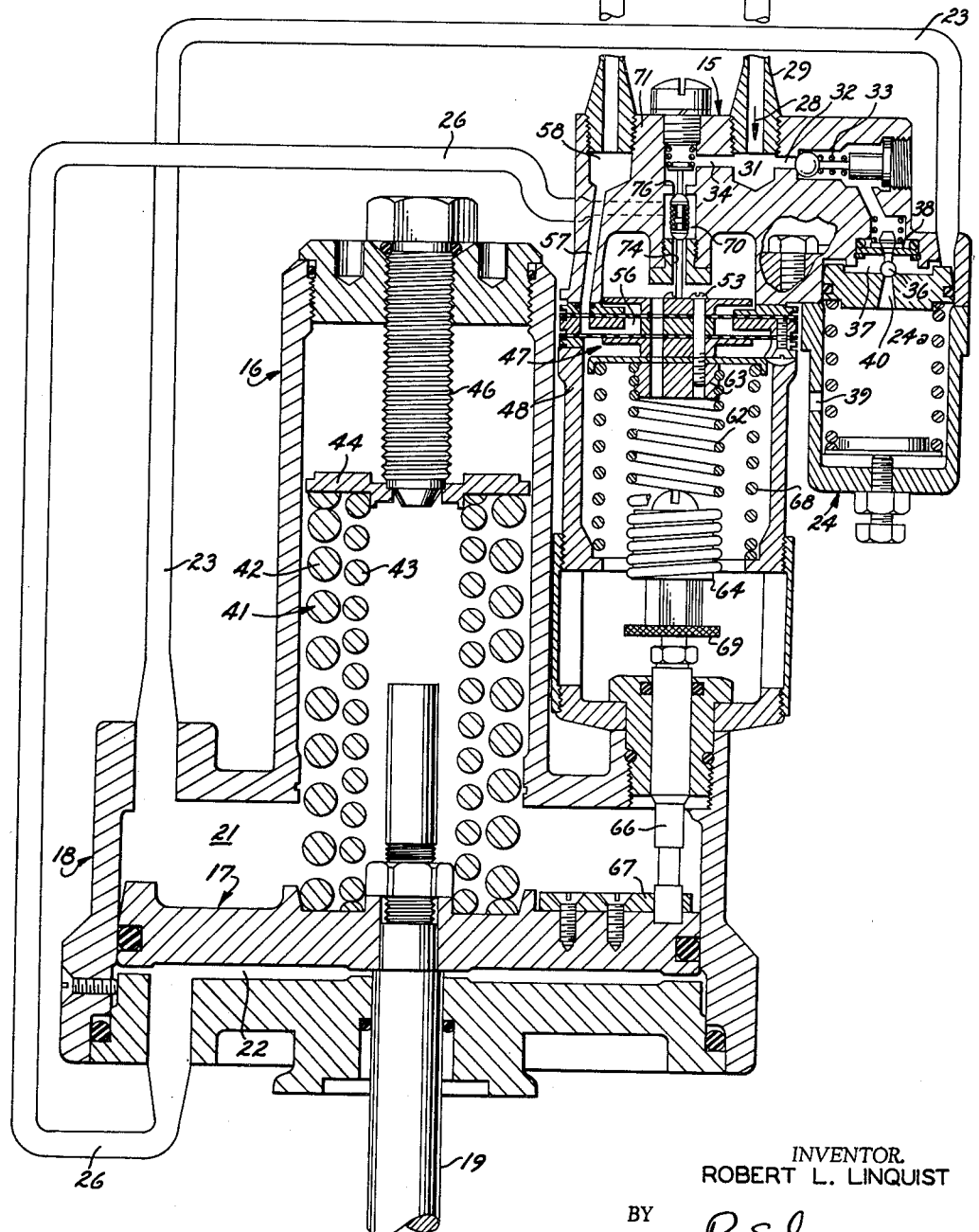
FIGURE 1 is a substantially diagrammatic view, illustrated in vertical cross-section as taken substantially through the center of the pilot valve of this invention and a pneumatic actuating device associated therewith.
Figure 2:
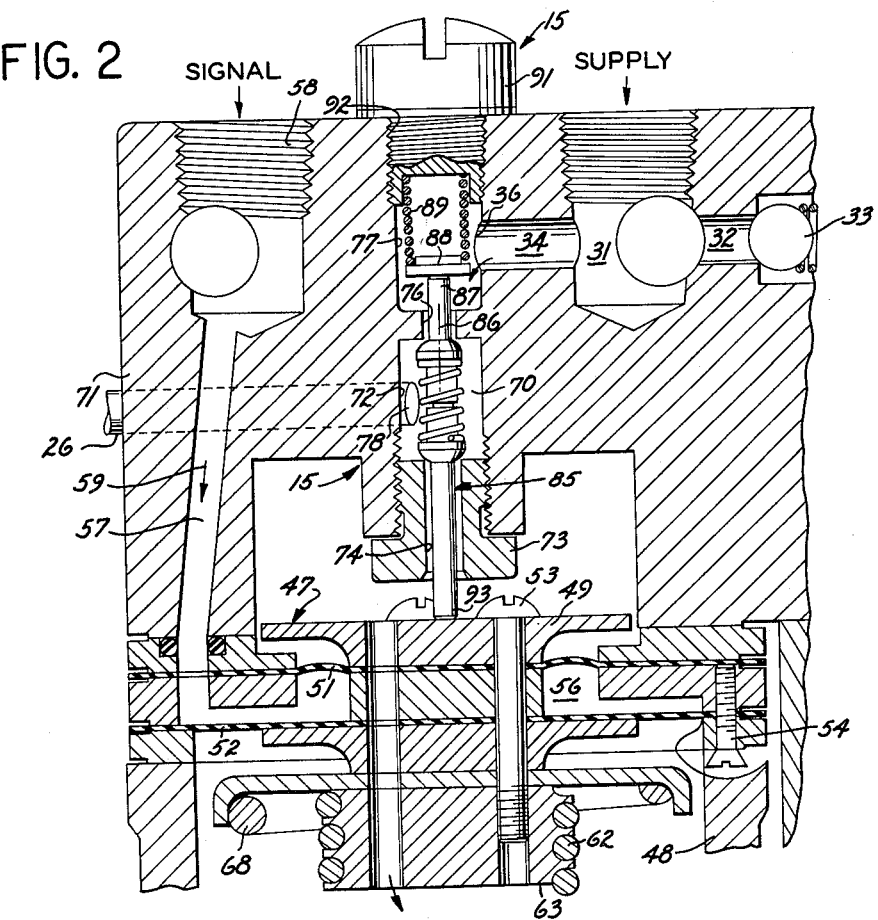
FIGURE 2 is an enlarged, fragmentary, vertical cross-sectional view, as taken substantially through the center of the pilot or relay valve of FIGURE 1 and showing a load cell associated therewith in greater detail.

The piston 17 is biased downwardly, as viewed in FIGURE 1, by a compression spring means 41, which, in the instant embodiment, includes a pair of coaxial coil spring members 42 and 43 bearing between the upper surface of the piston 17 and an adjustable spring keeper 44 adjustable as by a threaded member 46 bearing against the keeper 44. A load cell, generally designated by the numeral 47, is, as best seen in FIGURES 1 and 2, inclusive, movable in a cylinder 48 supported by the actuator 16, and generally comprises a substantially central member 49 which is supported by a pair of spaced diaphragms 51 and 52 held to discrete portions of the central body 49 by a pair of fasteners 53. The diaphragms 51 and 52 are supported at their outer periphery in portions of the cylinder 48 by fasteners 54 to define an annular regulating pressure space 56 between diaphragms. The annular space 56 communicates, through a passageway 57, with a source of varying signal pressure of predetermined origin entering the body of the pilot valve 15 through the port 58, as indicated by the arrowed line 59. An increase in the signal pressure through the passageway 57 into the annular space 56 produces a net downward force upon the load cell 47 because of the differential diaphragm areas, the diaphragm 52 having a substantially larger effective area than the diaphragm 51, as clearly observed in the drawings, particularly in FIGURES 2 and 3, causing the load cell to move downwardly. Conversely, when the signal pressure in the passageway 57 entering the annular space 56 is reduced, the load cell moves upwardly. As will be hereinafter described, upward movement of the load cell reduces the pressure in actuating chamber 22 of the cylinder 18 to cause the piston 17 to move downwardly in its cylinder and downward movement of the load cell increases the pressure in the actuating chamber to cause the piston 17 to move upwardly. The downward movement of the piston 17 causes an increased force on the load cell to be produced by a tension spring 62 connected between a spring keeper 63 secured to the load cell by the fasteners 53 and an adjustable spring keeper 64 secured to a rod 66 which, in turn, is secured to the piston 17 as at 67. In the instant embodiment, an additional compensating spring 68 is coaxially provided to always cause the variable net force of the combined springs 62 and 68 to be in an upward direction. On the other hand, upward movement of the piston 17 causes an increase in upward force to be exerted on the load cell by the combination of springs 62 and 68. When the force of the spring combination balances the force output of the load cell, the pilot valve spindle returns to null position and the piston rod 19 assumes the new position called for by the new signal pressure. The spring keeper 64 is adjustably secured to the shaft 66 by a threaded connection which can be adjusted as through an adjusting nut 69 to vary the signal pressure valve in space 56 at which time piston 17 will begin to move.

The pilot valve 15 comprises, as best seen in FIGURES 2, and 4–8, a chamber 70 defined in the body 71 of the valve by a bore 72 which is closable at its lower end by a threaded plug 73 having a bore 74 extending therethrough and defining an outlet to the chamber 70. An inlet 76 to the chamber 70 is formed by a bore communicating with the chamber and between the chamber 70 and an upper cavity 77. The cavity 77 communicates with the passageway portion 34 of the bifurcated passageway 31 for receiving the source of supply pressure from the passage 29. An additional opening 78 is provided in the body 71 and communicating between the chamber 70 and the actuating pressure chamber 22 of the cylinder 18 through the passageway 26.

An annular valve seat is provided at each of the inlet and outlets 76 and 74, respectively, and designated by the numerals 81 and 82, respectively, the valve seats being coaxial and in opposed relationship to each other.

A valve spindle, generally designated by the numeral 85, extends through the chamber 70 and is movable along an axis 86 which is coincident with the axes of the valve seats, the valve spindle 85 having an upper end 87 juxtaposed to a spring keeper 88 biased downwardly by compression coil spring 89. The spring 89 is juxtaposed as by a plug member 91 threadedly engaging an internally threaded bore 92 extending through the body 71 in coaxial relationship to the axis 86. The spindle 85 further includes an opposed end 93 which is juxtaposed to the upper surface of the load cell 47 to be moved by the load cell in response to movement of the load cell 47 when moved by the signal pressure directed into the annular space 56 to move the load cell upwardly or downwardly, or by the tension spring 62 receiving movement through the shaft 66 connecting the load cell to the piston 17.

The valve spindle 85 is provided with a pair of longitudinally spaced annular shoulders 94 and 96 in opposed relationship to each other, the shoulder 94 being adjacent to the annular seat 81 and the shoulder 96 being adjacent to the annular seat 82 and preferably formed by a circumferentially reduced portion 95 provided on the spindle and between the shoulders.

A valve element is slidably disposed on the spindle 85 adjacent to each shoulder, there being an upper valve element 97 adjacent to and abutable with the shoulder 94 and a second element 98 adjacent to shoulder 96 and abutable therewith. Each valve element includes a spherical outer end surface 99 cooperable with its adjacent annular seat to seat thereagainst when moved in a direction towards its seat. Each valve element further includes a reduced shank 101, the valve elements being dimensioned so as to provide a space 102 between their adjacent respective ends 103 when the valve elements are biased apart and into abutment with their respective shoulders. The valve elements are advantageously provided with longitudinal bores 104 extending therethrough and slidable on the external surface of the circumferentially reduced portion 95 of the spindle and a counterbore 106 adjacent their outer ends forming sockets for receiving enlarged spindle portions 107 adjacent to the reduced portion 95 of the spindle, thereby forming outwardly facing shoulders 108 cooperative with their respective shoulders 94 and 96 for abutment therewith. The reduced shanks 101 of the valve elements form, together with their respective frusto-conical enlarged portions, opposed inwardly-facing shoulders 109 against which the outer ends of a compression coil spring 110 abut to bias the elements apart. In this manner, the spring 110 bears against the shoulders 109 to normally form the space or gap 102 between the inner ends 103 of the shanks 101 by biasing the shoulders 108 of the valve elements against their respective shoulders 94 and 96. Obviously, the seats 108 can support sealing washers to cut down leakage and the seats could be conically shaped for the same purpose.

To facilitate mounting of the valve elements 97 and 98 and the spring 110 on the spindle 85, the spindle preferably comprises a pair of discrete spindle sections 111 and 112 which are coaxial and may be separated for assembling the valve elements 97 and 98 and the spring 110 on the spindle after which the spindle sections may be permanently or otherwise secured together to hold the valve in predetermined spaced reciprocal relationship to the spindle. The upper spindle section 111 (formed with the annular shoulder 94 and the reduced circumferential surface 95 of predetermined length), has a coaxial blind bore 113 forming a socket in which a coaxial pin 114 formed on the lower spindle section 112 (having the shoulder 96), is secured, by press fitting, threaded connection, or other suitable means. The distance between shoulders 94 and 96 is predetermined by the length of the reduced portion 95 so as to provide a predetermined spacing 102 between the ends 103 of the valve elements when their outer shoulders 108 are biased with their respective shoulders 94 and 96.

Figure 3:
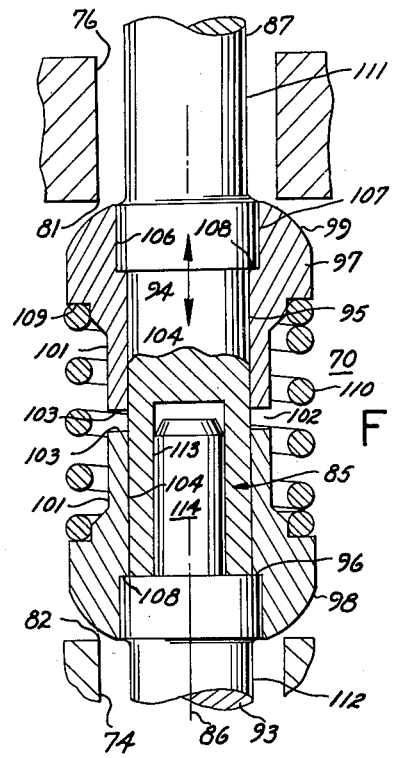
FIGURE 3 is a further enlarged, fragmentary view, illustrating the pilot valve in greater detail and in a null or bleed operative position.

It will now be more clearly understood, from the foregoing description, that the spindle means 85 is positionable into a normal, intermediate position determined by the normal bias of rate spring action through the load cell 47 and the force of the spring 89 wherein each valve element 97 and 98 is spaced from its respective annular seat 81, 82 a very small distance for bleeding supply fluid pressure passing through the inlet 76 into the chamber 70 and outwardly thereof through the outlet 74. In this null position, the supply fluid by-passes the opening 78, as best seen in FIGURE 3. Therefore, in this null or bleeding position, the openings at the inlet and outlet annular seats are relatively small to produce a relatively slow bleed.

As best seen in FIGURE 4, when the spindle 85 is moved upwardly, as indicated by the arrowed line 116, the valve element 97 moves upwardly into engagement with seat 81 since spring 110 holds the shoulder 108 against the shoulder 94, and this engagement closes the inlet 76. Such upward movement simultaneously further unseats the elements 98 from the seat 82 to increase the opening of the outlet 74. However, the opening at the seat 82 remains relatively small, being the sum of the relatively small openings between the elements and their respective seats in the null or bleed position. As the spindle continues to move upwardly, in the direction indicated by the arrowed line 116', as seen in FIGURE 5, the shoulder 94 is moved away from the adjacent upper shoulder 108 of the valve element 97 and the shoulder 96 continues to bear against its adjacent shoulder 108 of the lower element 98 to continue upward movement of the lower element 98 until its inner end 103 abuts with the inner end 103 of the upper element 97 thereby increasing the annular gap between the seat portion 99 of the element 98 and the annular seat 82 of the outlet 74 thereby increasing the flow of fluid through the outlet.

Conversely, when the spindle member 85 is moved in an opposite, downward direction, as viewed in FIGURE 6 and indicated by the arrowed line 117, the reverse occurs whereby the lower element 98 is moved to close the seating 82 and thereby close the outlet 74 and simultaneously further open the inlet 76 by further unseating the upper element 97. As illustrated in FIGURE 7, as the spindle continues to move in the same downward direction, indicated by the arrowed line 117', the valve element 97 continues to move downwardly until the ends 103 are in abutment, thereby compressing the spring 110 and enlarging the gap between the spherical surface 99 of the valve element 97 and the seat 81 of the inlet 76 to provide an increased flow of supply fluid under regulated pressure through the inlet 76 and into the chamber 70. Inasmuch as, in this position, the outlet is closed by the valve element 98, the flow of supply fluid is directed into the opening 78 to be communicated to the actuating pressure chamber 22 of the cylinder 18 of the positioning device, through the passageway 26.

Therefore, in accordance with this improved construction, the spindle 85 of the pilot valve is positionable into a null position whereby both the inlet and outlet, 76 and 74, respectively, are open for slow bleeding of the chamber 70 therethrough and in one of its extreme positions, the outlet is substantially increased in area to provide a relatively substantial or fast flow through the outlet 74 whereas, in its other extreme position, the pilot valve closes the outlet and opens the inlet for an appreciably increased flow of supply fluid under regulated pressure to the opening 78 through the inlet 76.

In the application of the pilot valve of this invention, to the pneumatic actuating valve device, herein illustrated, the operation is as follows:

The pressure regulator valve 24 receives supply pressure, indicated by the arrowed line 28, through the conduit 29, the passages 31 and 32 where the fluid passes the check valve 33 and encounters the valve 38 of the pressure regulating valve 24. When the desired pressure develops in passage 37, the valve 36 closes and is communicated through the passageway 23 to the chamber 21 of the cylinder 18. This pressure is constant. When an excess of pressure develops it is relieved through the orifice 40 and the passage 39. The supply pressure 28 is also directed through the passageway 34 to the pilot valve 15 in which the spindle 85 is positioned by the load cell 47. The position of the pilot valve 85 with respect to its annular valve seatings 81 and 82 of the inlet and outlet 76, 74, respectively, determines the pressure in the chamber 70, as previously described, wherein either the inlet 76 is open and the outlet 74 is closed, the inlet 76 is closed and the outlet 74 is open, or both the inlet and outlet are open for bleeding of the chamber 70.

Signal pressure is received into the port 58 and passes through the passageway 57 into the space 56 between diaphragms 51 and 52 of the load cell 47 and produces a net downward (as viewed in the drawings) force to the spindle in response to an increase in signal pressure because of the differential diaphragm areas. This movement results in a downward movement of the spindle 85 to open the seat 81 and close the seat 82 and thereby cause an increase in the actuating pressure in chamber 70 which is communicated with the pressure actuating chamber 22 to move the piston 17 upwardly against the force of the spring means 41 and building pressure in chamber 21 and, as a result, move the actuating piston rod 19 upwardly. The piston 17, being connected through a shaft 66 and a rate spring 62 to the bottom of the load cell 27 transmits the upward movement of the piston 17 to reduce the force of the spring 62 on the load cell 47 until the increased signal pressure in the space 56 is balanced, at which time the load cell will move back to its initial position (of FIGURE 2) and position the valve stem 85 into its intermediate position of FIGURE 3 to null the valve elements 97 and 98, with respect to their respective seats 81 and 82 to bleed the chamber 70. The piston 17 will then have assumed the new position called for by the increased signal pressure in the space 56. It is centered, null position, the pilot valve permits a bleed past the seats 81 and 82.

When the signal pressure in the passage 57 communicating with the space 56 is reduced, the load cell moves upwardly to open the outlet 74 at seat 82 and thereby reduce the pressure in the chamber 70 and the actuating chamber 22 of the cylinder 18 causing the piston 17 to move downwardly. The downward movement of the piston causes an increased force on the load cell to be produced through the tension spring 62 until the force of the spring again centers the load cell and nulls the pilot valve 15. Thereafter, the normal bleed past the valve will take place.

It is to be understood that an increase in the valve load of the piston 17 will enter into the force balance the same as a change in the signal pressure in the space 56 to cause adjustment of the actuating pressure in the chamber 22. Further, because of the particular construction of the valve 15, in acordance with this invention, the bleed clearance at the seats 81 and 82 can be, with the valve in its normal position, substantially reduced. However, upon the movement of the valve stem 85 in one direction or the other, a valve element engages its respective seat almost immediately because of the small bleed area and further movement of the valve spindle will move the other valve element further away from the seat by the amount of space 102 between elements so that a substantially large travel of the actuating valve element is available. Therefore, because of the increased travel, the valve elements are spaced further away from their valve seats when uncovered by the additional movement of the valve spindle to provide a relatively large flow to the operating chamber 22 and resulting in a relatively fast response of the piston 17. When the pilot valve 15 is again returned to its normal position (of FIGURE 4), small bleed areas at both seats 81 and 82 will again become effective.

Figure 8:
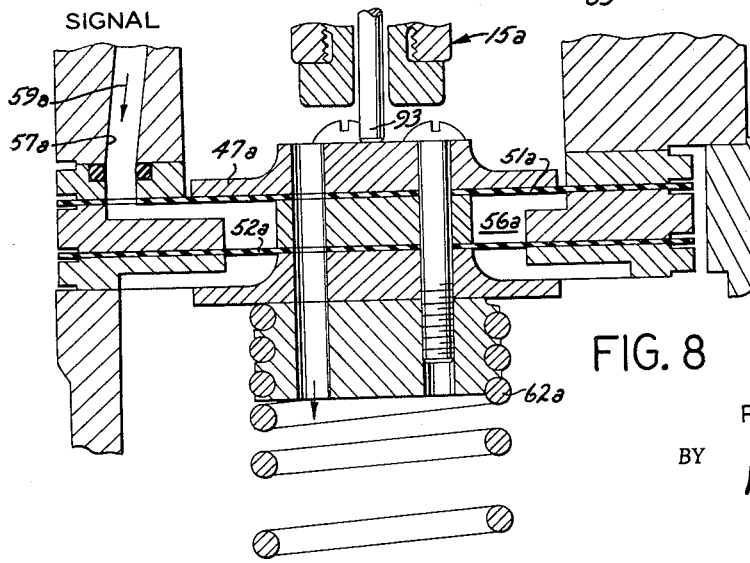
FIGURE 8 is a fragmentary, vertical, cross-sectional view, similar to the load cell of FIGURE 2, and showing a modified embodiment thereof.

Referring in detail to FIGURE 8, a second embodiment of this invention is illustrated in which the load cell is modified so as to act in reverse to the action disclosed in the first embodiment to reverse the action of the pilot valve 15a, identical to valve 15, and in which like parts similar to the first embodiment, are designated by like numerals to which an "a" is added. In this instant modification, the load cell 47a configuration is reversed so that an increased signal pressure referred to by the numeral 59a in passage 57a moves the load cell 47a upwardly, as viewed in the drawings. In this configuration, the spring 68 can be eliminated and the motion of the piston, like the piston 17, is simply reversed with respect to the above description as related to the first embodiment. In other words, an increase in signal pressure will move the load cell 47a up to reduce the actuating pressure in the chamber 70a and the piston like the piston 17 then moves downwardly. The rate spring 62a is then extended until its force balances the force of the load cell 47a and the pilot valve 85a is biased back into its normal bleeding position shown in FIGURE 9. In this embodiment, the load cell 47a includes an upper diaphragm 51a having a larger effective area than its lower diaphragm 52a so as to act in a reversed direction, i.e., load cell 47a moves upwardly in response to an increase of signal pressure in space 56a and downwardly in response to a decrease of signal pressure. In accordance with this action, the valve 85a closes the inlet from the supply pressure and opens the outlet 74a to connect the chamber 70a to atmosphere when the signal pressure is increased and, conversely, opens the inlet to the supply pressure and closes the outlet when the signal pressure is decreased.

Referring more particularly to FIGURES 9–11, inclusive, a further embodiment of this invention is most advantageously illustrated in which the construction of the valve spindle and its valve elements is substantially modified but which produces essentially the same result as the first embodiment, and wherein like parts, similar to like numerals of the previous embodiments is designated by like numbers with the letter "b" added thereto.

In the instant embodiment of a pilot valve, generally designated by the numeral 15b, the valve spindle 85b is, as illustrated, formed with a pair of spaced circumferentially relieved portions 116 and 117 defining outwardly-facing, inner shoulders 118 and 119, respectively, against which inwardly facing valve elements 121 and 122, respectively, are slidably disposed and movable relative to each other a distance defined by gaps 123 and 124, respectively, provided between the outer ends of the elements 121 and 122 and inwardly-facing, second shoulders 126 and 127, respectively, formed on the relieved portions 116 and 117, respectively.

The spindle 115, as prior spindle 85, is reciprocable relative to inlet and outlet ports 81b and 82b, respectively, so as to be in the normal intermediate position of FIGURE 9 wherein both inlet and outlet are opened and is movable in one direction or the other for opening one of the valve seats while closing the other; continued movement of the valve spindle 115 in one of the directions resulting in further opening of one. The valve elements 121 and 122 are constructed similarly to those of the first embodiment, but movable in a reverse direction for closing their adjacent annular seats. It will be noted that, in this embodiment, the valve seats are located outside of the chamber 70b and each of the valve elements 121 and 122 is mounted so as to move towards the chamber 70b to close its adjacent valve seat which is contrary to the movement of the first embodiment. Further, in this instant embodiment, the valve elements 121 and 122 are biased against their adjacent shoulders 118 and 119 by compression springs 128 and 129, respectively, in a direction towards their adjacent valve seats, 131, 132, respectively. The springs 128 and 129 are backed up on the spindle 115 by shoulder members 133 and 134, respectively. The shoulder member 133 also acts as a spring keeper relative to the balancing spring 89b, similar to the spring 89 of the first embodiment.

The construction of the spindle 115 is generally similar to that of the spindle 85, in which the spindle is fabricated to include a plurality of coaxial sections which are separable for mounting the valve elements to slide on their reduced portions after which the spindle is secured in assembled relationship for retaining their respective valve elements and their springs. For this purpose, a centermost section 136 of the spindle 115 has outwardly and oppositely extending pins 137 and 138 which are press fitted or otherwise secured to fit in sockets 139 provided in the circumferentially reduced portions 116 and 117 of a pair of opposed outermost sections 141 and 142. In this manner, the spacing of gaps 123 and 124 is advantageously predetermined to predetermine the axial movement of the valve elements relative to their valve seatings.

Similarly to the resulting action of the first embodiment, but effectively movable conversely thereto, the spindle 115, when moved upwardly, as illustrated in FIGURE 10, causes the valve element 122 to seat on the inlet opening 81b and open the valve seating 131 of the outlet 82b whereby regulated supply pressure is closed from the chamber 70b and the outlet port relieves the pressure in the chamber and, as seen in FIGURE 11, continued movement of the spindle 115 in the same direction causes a lost motion between the valve element 122 and the spindle 115 to further open the outlet 82b which, as best seen in FIGURE 9, is vented to atmosphere as indicated at the passage 143. The regulated supply pressure from the passageway 31b is directed through a passageway 144 which communicates between the source of regulated supply pressure and the cavity or chamber 146 communicating with the inlet 81b.

Conversely, when the spindle 115 is moved downwardly, the inlet 81b is opened and the outlet 82b is closed to increase pressure effective on the piston of the positioning device, like 16.

FIGURE 9 further illustrates an additional modification of the porting of supply fluid pressure to the pilot valve 115, or optionally, the pilot valve 15, wherein the supply fluid pressure is supplied outwardly of the chamber 70b from below while it is vented from above, through the passageway 143. Further, in this modification, it is to be seen that both the chambers 146 above the load cell 47b and a chamber 147 below the load cell are connected together by a passageway 148 to counteract the effect of the supply pressure acting on diaphragm 51b. Signal pressure is admitted into the port 58b, as indicated by the arrowed line 59b, to pass through a passageway 57b communicating with the annular area 56b determined by the upper and lower diaphragms 51b and 52b, respectively, of the load cell 47b.

In this form, effectively similar to the embodiment of FIGURE 2, the upper diaphragm 51b has a smaller effective area than does the lower diaphragm 52b so that, in response to an increase of signal pressure in the space 56b, the load cell is moved downwardly to bias the spindle 115 downwardly to open the inlet 81b and close the outlet 82b for connecting the chamber 70b with an actuating chamber like 22 to move its piston 17 upwardly. This action is opposite to that of the embodiment of FIGURE 8 wherein a load cell 47a having an arrangement in which the upper diaphragm 51a has the larger effective area and the lower diaphragm has the smaller effective area causes a reverse action of the pilot valve 15a which is identical in construction to the pilot valve 15 of the first embodiment. The embodiments of the pilot valves 15 and 115 of FIGURES 2 and 9, respectively, are direct acting positioners wherein an increase in signal pressure results in admitting supply pressure to the actuating chamber 22 whereas the embodiment 15a of FIGURE 8 is an indirect or reverse acting positioner wherein an increase in signal pressure results in venting the actuating chamber 22 and an extending movement of the piston rod. In each embodiment, however, the signal pressure actuated load cell means thereof is reciprocable and movable in one or the other direction to seat a valve element almost immediately on its valve seating because of its small bleed area and wherein further movement of the valve spindle in the direction will move the other valve element away from its annular seating by the amount of space (102, 123, or 124) permitting relative movement of the element to the spindle means so that a relatively large travel of the actuating valve element is available. Such construction provides a large travel for the valve elements and a large flow to the actuating chamber of the piston, or other actuating means, to afford a relatively fast response of the piston. Also, in each embodiment, when the valve spindle is again returned to its normal intermediate position, the small bleed areas at both seats will again become effective. Thus, the present invention, in its various embodiments, provides for both small bleed range and fast response.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. In a pneumatic valve actuator of the type having an actuator piston movable in a cylinder for moving an actuator piston rod, and load cell means adapted to receive a signal fluid pressure and movable in opposite directions in response to changes of the signal fluid pressure to actuate a pilot valve and control the introduction of fluid pressure to said cylinder through a valve output passage, an improved pilot valve comprising:
a body having a chamber therein;
means defining an inlet into said chamber and adapted to communicate with a source of regulated supply fluid pressure;
means defining a vent passage from said chamber connected to atmosphere;
means defining an opening in said body providing said output passage;
an annular valve seat at each of said inlet and said outlet, said valve seats being coaxial and in opposed relationship to each other;
valve spindle means extending through said chamber and movable along an axis coincident with the axes of said valve seats, said spindle means having a pair of spaced, annular shoulders in opposed relationship;
a valve element slidably disposed within said chamber on said spindle means adjacent to each shoulder, said valve elements being longitudinally spaced on said spindle means between said shoulder and mounted for movement thereon relative to their respective shoulders and to each other;
compression spring means located between said valve elements for biasing said valve elements apart into abutment with their respective shoulder and towards their respective valve seats,
said spindle means being normally positioned to simultaneously unseat both said valve elements from their respective annular valve seats while in their spaced apart relationship for bleeding said chamber, and said spindle means being responsive to a change in fluid pressure in said output passage to move in a direction to seat one of said valve elements on its respective annular seat and unseat from said bleed position the other valve element relative to its respective valve seat whereby continued movement of said spindle means moves the other of said valve elements the distance of said spacing between the valve elements to further unseat said other valve relative to said other annular seating.

2. In a pilot valve comprising:
a body having a chamber therein;
means defining an inlet into said chamber and adapted to communicate with a source of regulated supply fluid pressure;
means defining an outlet from said chamber and adapted to be vented to atmosphere;
means defining an opening in said body for providing an output passage containing the variable pressure output from said valve;

an annular valve seat at each of said inlet and said outlet, said valve seats being coaxial and in opposed relationship to each other;

valve spindle means extending through said chamber and movable on an axis coincident with the axes of said valve seats, and having a pair of spaced, annular shoulders in opposed relationship;

a valve element slidably disposed on said spindle means adjacent to each shoulder and abuttable therewith, said valve elements being spaced apart between said shoulders slidably mounted on said spindle means for axial movement relative to each other; and spring means located between said valve elements for biasing said valve elements apart into abutment with their respective shoulders and towards their respective valve seats, said spindle means being positionable for simultaneously unseating both valve elements from their respective annular valve seats while in their spaced apart relationship for bleeding said chamber, and said spindle means being movable in a direction for seating one of said valve elements against its respective annular seat while unseating the other of said valve elements from its respective annular seat, whereby continued movement of said spindle in said direction moves the other of said valve elements to further unseat said other valve elements from said other annular seating.

3. In a pilot valve including:

a body having a chamber therein;

means defining an inlet into said chamber and adapted to communicate with a source of regulated supply fluid pressure;

means defining an outlet on said chamber and adapted to be vented to atmosphere;

means defining an opening in said body for providing an output passage containing the variable pressure output from said valve;

an annular valve seat at each of said inlet and said outlet, said valve seats being coaxial and in opposed relationship to each other;

valve spindle means extending through said chamber and movable along an axis coincident with the axes of said valve seats, said spindle means having a reduced intermediate portion defining a pair of spaced annular shoulders in opposed relationship;

a pair of spaced valve elements slidably disposed on said reduced portion of said spindle means, one adjacent to each shoulder for movement relative to each other and to their respective shoulders; and spring means located between said valve elements for biasing said valve elements apart in abutment with their respective shoulders and towards their respective valve seats;

said spindle means being positionable to simultaneously unseat both of said valve elements from their respective annular valve seatings while in their spaced apart relationship for bleeding said chamber; and said spindle means being reciprocable on said coincident axis for seating one of said valve elements relative to its respective annular seat and unseating the other of said valve elements relative to its respective annular seat, whereby continued movement of said spindle means after seating said one of said valve elements on its respective annular seat results in moving the other of said valve elements the distance of said spacing between valve elements to further unseat said other of said valve seatings.

4. In a pneumatic valve actuator having an actuator piston movable in a cylinder for moving an actuator piston rod, said piston being resiliently biased in one direction by a resilient member and by a source of supply fluid under predetermined regulated pressure in said cylinder, and load cell means adapted to receive a signal fluid pressure, said load cell means being movable in opposite directions in response to a change of the signal fluid pressure, and having a connection with the piston, a pilot valve comprising:

a body having a chamber therein;

means defining an inlet into said chamber and adapted to communicate with said source of regulated supply of fluid pressure;

means defining an outlet from said chamber and adapted to be vented to atmosphere;

means defining an opening in said body and adapted to be connected to said cylinder for communicating with said chamber for moving said piston in an opposite direction in response to a change of pressure in said chamber;

an annular valve seat at each of said inlet and said outlet, said valve seats being coaxial and in opposed relationship to each other;

valve spindle means extending through said chamber and movable along an axis coincident with the axis of said valve seats, said spindle having a pair of spaced annular shoulders in opposed relationship;

a valve element slidably disposed on said spindle means adjacent to each shoulder, said valve elements being longitudinally spaced on said spindle means and mounted for movement thereon relative to their respective shoulders and to each other; and compression spring means located between said valve elements to bias said valve elements apart in abutment with their respective shoulders and towards their respective valve seatings, said spindle means being adapted to be connected to the load cell for movement in opposite directions in response to changes of the signal pressure applied to said load cell and said spindle means being normally positionable into a null position in response to a predetermined constant signal pressure on said load cell so as to simultaneously open both said inlet and said outlet, and responsive to the changes of the signal pressure to close said inlet and open said outlet, from said normal bleed position whereby said supply pressure in said chamber is vented to atmosphere and said piston is moved in said one direction, and for movement in an opposite direction in response to a decrease of the signal pressure applied to said load cell and so as to open said inlet from said normal bleed position and close said outlet whereby said supply pressure is directed into said cylinder through said opening so as to move said piston in an opposite direction, and wherein continued movement of said spindle means in one of said directions to seat one of said valve elements to its respective annular valve seating moves the other of said valve elements the distance of said spacing between valve elements to further unseat the other of said annular valve seatings; said spindle means including a plurality of coaxial discrete sections, one of said sections having a reduced portion defining one of said shoulders and a socket and the other section having the other of said shoulders and a reduced portion securable in said socket and said valve elements being movably disposed in said reduced portion of said one of said sections.

References Cited by the Examiner
UNITED STATES PATENTS

| 796,706 | 8/05 | Clark | 92—37 |
|---|---|---|---|
| 2,556,746 | 6/51 | Ashton et al. | 91—384 |
| 2,558,506 | 6/51 | Annin | 91—386 |
| 2,582,626 | 1/52 | Escher | 91—457 |
| 2,711,757 | 6/55 | Gardner | 91—401 |
| 2,919,716 | 1/60 | Boyer | 137—636 |
| 3,004,526 | 10/61 | Greenless | 91—457 |

FRED E. ENGELTHALER, Primary Examiner.

SAMUEL LEVINE, Examiner.